United States Patent Office 3,378,545
Patented Apr. 16, 1968

3,378,545
RECOVERY OF NITROCELLULOSE FROM SURPLUS POWDERS
Samuel A. Riccardi, Godfrey, Ill., assignor to Olin Mathieson Chemical Corporation, a corporation of Virginia
Filed Oct. 5, 1965, Ser. No. 493,170
17 Claims. (Cl. 260—223)

ABSTRACT OF THE DISCLOSURE

A process for the recovery of nitrocellulose from ground surplus powder containing nitrocellulose and non-nitrocellulose organic materials, comprising slurrying the ground surplus powder in a solvent to effect solvation of the non-nitrocellulose organic materials, the solvation being carried out in an inert gaseous atmosphere and at an elevated temperature.

---

This invention relates to a method of treating surplus smokeless powder, and more particularly to a method of treating surplus smokeless powder to recover nitrocellulose therefrom.

Surplus smokeless powders such as governmental surplus cannon powder is used as a source of nitrocellulose which is the basic raw material in the manufacture of smokeless powder. To obtain the nitrocellulose, the surplus powder must be treated to remove non-nitrocellulose materials such as dinitrotoluene, dibutyl phthalate, diphenylamine, and other constituents which have been added to the nitrocellulose during the manufacture of the surplus powder.

One process that has been used for recovering the nitrocellulose from surplus powders involved leaching with an aromatic solvent. In such a process, the surplus powder was mixed with water in a large vat to form a slurry and a suitable solvent such as benzene then added. Leaching was carried out for about four hours at which time the solvent and the water were drained off by decantation. New solvent and water was then added to the surplus powder and the leaching operation was repeated for about four hours. The number and the time of the leaching varied depending upon the amount of non-nitrocellulosic materials present in the original powder, although the number was usually restricted to three.

This process suffered from several disadvantages. Under usual conditions of time and number of leachings, the recovered nitrocellulose still contained from 1.2 to 2 percent extractables. In addition, the process was relatively uneconomical in that it resulted in a relatively low-production capacity per unit volume of leaching equipment.

It is, accordingly, an object of this invention to provide an improved process for recovering nitrocellulose from surplus powder.

It is a more specific object of this invention to provide an improved process for recovering nitrocellulose from surplus powder wherein the recovered nitrocellulose contains a relatively low percent of extractables.

Yet another object of this invention is to provide a process for leaching nitrocellulose from surplus powders whereby a relatively high production capacity per unit volume of leaching equipment is obtained.

Still another object of this invention is to provide a more economical process for leaching surplus powders to recover nitrocellulose.

A further object of this invention is to provide a process which results in a faster and more economical rate of leaching surplus powders to recover nitrocellulose.

These, and other objects, may be accomplished according to a preferred embodiment of this invention by treating surplus smokeless powder with a suitable solvent in an atmosphere of an inert gas. Prior to the leaching operation, water is drained from an aqueous slurry of ground surplus powder after which a suitable solvent is added to the surplus powder in an atmosphere of an inert gas.

The actual leaching operation may utilize a countercurrent system including two leaching vessels. The surplus powder remains in one vessel for three separate leachings while the solvent is pumped from vessel to vessel after each leaching operation.

This invention may be more readily understood by reference to the drawing in which.

Figure 1:
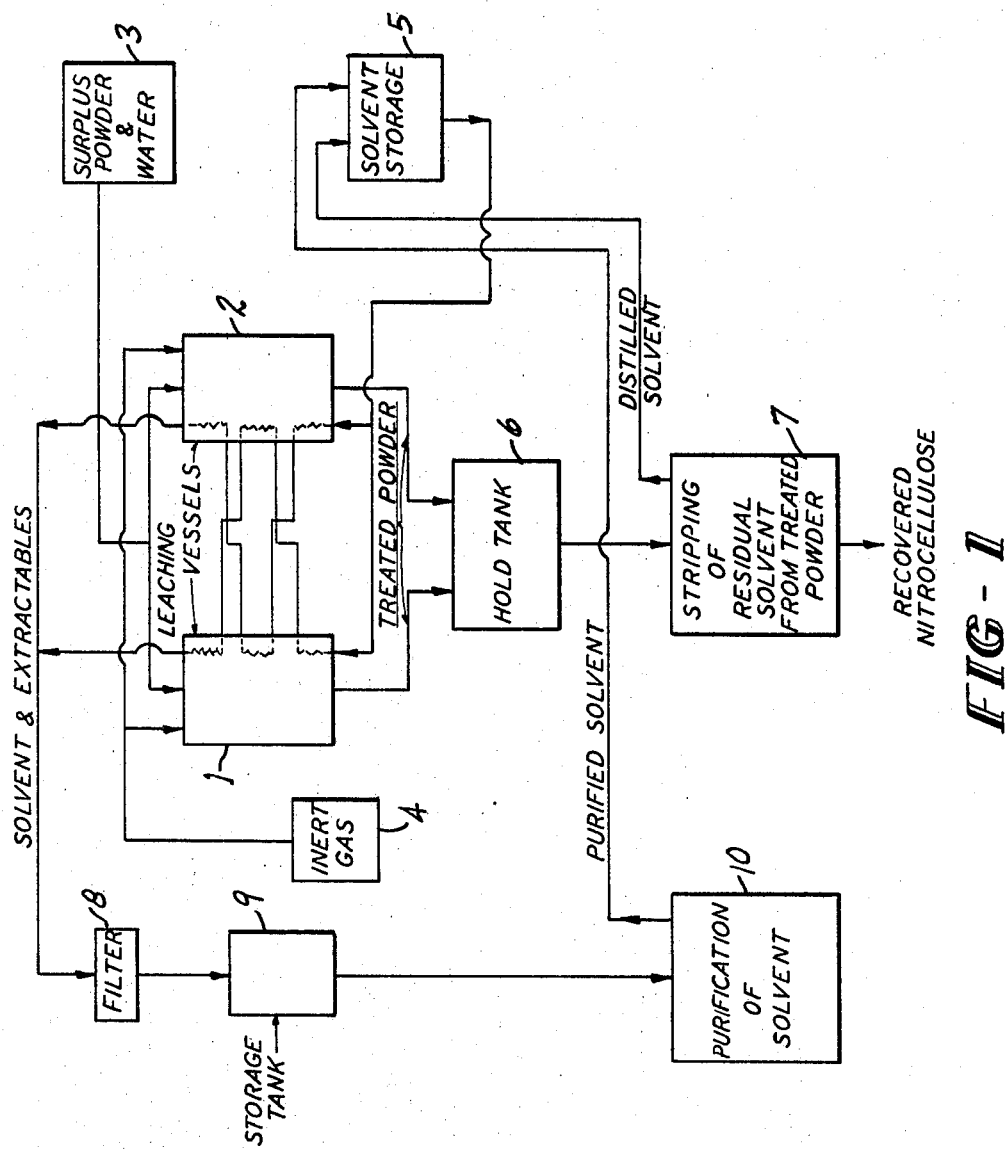
FIGURE 1 is a flow diagram of a preferred embodiment of the process.

In carrying out the process of this invention, suitable surplus smokeless powder is first ground in a hammer mill in the presence of water to provide a slurry in which the particles of smokeless powder have a maximum dimension of ⅛ inch or less. Such surplus smokeless powders as non-hygroscopic (NH) and flashless non-hygroscopic (FNH) smokeless powders are well adapted for use as a starting material for this process although other suitable surplus powders containing nitrocellulose may be used.

The slurry of ground powder and water may be temporarily stored in a powder tub 3. When the powder is to be leached, the slurry is pumped by suitable means into one of the two leaching vessels 1 or 2. After the powder has been pumped into a leaching vessel, the water is drained from the system and an inert gas, that is to say a gas which is substantially devoid of free oxygen is added to the system from a suitable source 4 under a pressure of about 3 p.s.i.g. to provide a non-combustible atmosphere. Suitable inert gases include nitrogen, carbon dioxide, and combustion products of hydrocarbons with a low oxygen content in the combustion gases, although other gases may be used so long as they are inert to prevent the setting up of a hazardous explosive atmosphere.

A suitable amount of solvent is then pumped from a solvent storage tank 5 into one of the leaching vessels 1 or 2. Suitable solvents for use in this process include benzene, toluene, and isopropyl alcohol, although other solvents may be used. The prime requirement of such solvents is that they be a non-solvent with respect to the nitrocellulose but a solvent with respect to the non-nitrocellulose materials in the surplus powder.

In addition, the solvent composition may contain about ten percent by weight of ethyl acetate which serves to soften the particles of surplus powder and results in a faster rate of leaching. Other materials which are miscible with the leaching solvent and serve to soften the nitrocellulose may also be used and include butyl acetate, acetone and methyl ethyl ketone among others.

The surplus powder is then leached at a suitable temperature and for a suitable time during which the entire mixture is agitated by suitable means in each of the leaching vessels 1 and 2. Because of the instability of nitrocellulose at high temperatures, it is desired that the leaching operation be carried out at a temperature less than 85° C. and preferably at about 70° C. After the leaching operation, the agitator is stopped and the powder allowed to settle whereupon the solvent above the powder is decanted from the vessel and the remaining solvent filtered through a false bottom screen and drained off. The solvent may then be pumped either to the other leaching vessel or to an extract storage tank depending upon the number of times such solvent has been used for leaching as hereafter explained.

After the powder in a given leaching vessel has been leached for the third time, and the solvent decanted off and drained, water is added to the leaching vessel to form a slurry with the treated powder. The slurry is then dumped into a hold tank 6. At the proper time the slurry is pumped from the hold tank 6 to a still 7 wherein the residual solvent is stripped from the powder. Preferably, this is performed by a distillation process under vacuum so as to avoid subjecting the recovered nitrocellulose to high temperatures. Such residual solvent may then be pumped to the solvent storage tank 5 for reuse in the system while the extracted nitrocellulose may be stored until it is needed as the basic material in making smokeless powder.

The solvent, after it has been used for three leaching operation, is pumped through a filter 8 to an extract storage tank 9 where it may accumulate until it is ready for purification by a suitable distilling process performed in a still 10. After the solvent has been purified, it is pumped to the solvent storage tank 5 for reuse in the system.

The leaching operation utilizes a three stage countercurrent system wherein the surplus powder remains in one leaching vessel for three leaching operations while the solvent is pumped from vessel to vessel to perform three leaching operations. This countercurrent leaching system may be more readily understood by reference to FIGURE 2 wherein S refers to the solvent and the subscript indicates the number of times the solvent has been used for leaching; L refers to the operation of loading the aqueous slurry of ground surplus powder, draining the water, adding an inert gas to the system, and closing the leaching vessel; and D refers to the operation of opening the leaching vessel, adding water to form a slurry, and dumping the slurry into the hold tank.

Figure 2:
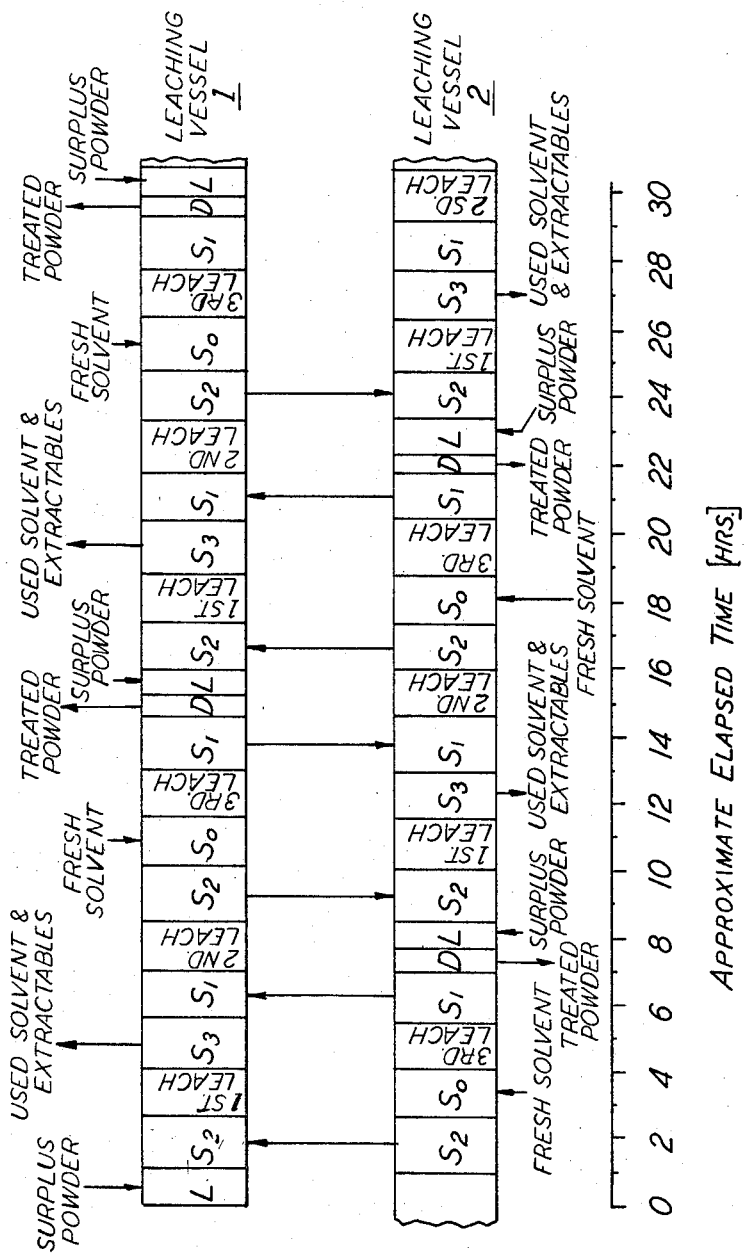
FIGURE 2 is a chart illustrating a time program for the process steps taking place simultaneously in each of the two leaching vessels.

As may be seen in FIGURE 2, while leaching vessel 1 is being loaded with a slurry of ground powder and water pumped from the powder tub 3, the surplus powder is leaching vessel 2 is undergoing its second leaching operation. After completion of the leaching operation in vessel 2, the solvent $S_2$ which was used for that operation is pumped from leaching vessel 2 to leaching vessel 1 which at this point contains surplus powder in an atmosphere of an inert gas. The mixture in leaching vessel 1 is agitated and heated to the desired temperature to perform the first leaching operation as described above. At the same time, fresh solvent $S_0$ is pumped from the solvent storage tank 5 to leaching vessel 2 in preparation for the third leaching process of the surplus powder in leaching vessel 2.

After the first leaching operation is completed in leaching vessel 1, the solvent $S_3$ is removed from the vessel and pumped through the filter 8 to the extract storage tank 9. At the same time, the powder in vessel 2 is undergoing its third leaching process by the fresh solvent $S_0$. After the completion of the third leaching operation in vessel 2, the solvent, now designated $S_1$, is pumped to leaching vessel 1 in preparation for the second leaching process of the powder contained therein.

While the second leaching process is being performed in vessel 1, the powder in vessel 2 is slurried with water and then dumped to the hold tank 5 for later processing in the still 7. Also during the second leaching operation in leaching vessel 1, a fresh slurry of surplus powder and water is pumped into vessel 2, the water drained, and an inert gas added under proper pressure to provide a non-combustible atmosphere.

Upon completion of the second leaching process in leaching vessel 1, the solvent $S_2$ is pumped to leaching vessel 2 in preparation for the first leaching operation of the powder contained therein. After the solvent $S_2$ has been pumped to the second vessel, and as the leaching operation is being performed, fresh solvent $S_0$ is pumped from the solvent storage tank 5 to leaching vessel 1 in preparation for the third and final leaching operation of the powder contained therein.

During the third leaching operation of the powder in vessel 1, the solvent $S_3$ which had been used for the first leaching operation in leaching vessel 2 is removed from the vessel and pumped through the filter 7 to the extract storage tank 8.

Upon completion of the third leaching operation in leaching vessel 1 the solvent $S_1$ is pumped from that vessel to leaching vessel 2 in preparation for the second leaching process of the powder in that vessel.

During the second leaching process of the powder contained in still 2, water is added to leaching vessel 1 to form a slurry with the treated surplus powder and such slurry is dumped into the hold tank 5 for later processing in still 6. A fresh slurry of ground powder and water may then be added to vessel 1 and the process continued in the manner explained above.

It will thus be seen that the first leaching operation of the powder in each of the the two leaching vessels is performed with the solvent containing the highest percentage of extractables while the last operation is performed with fresh solvent. Moreover, the solvent is continuously used for three operations before it is pumped to the extract storage tank and later purified.

Although the times set forth in FIGURE 2 are approximate, it will be seen that the entire cycle takes about 15 hours from the time a fresh slurry of ground powder and water is added to a vessel until the time the powder is dumped from the tank after three leaching operations. In addition, an individual leaching process lasts about an hour although the time may be varied according to the degree of purity of the nitrocellulose desired. It is to be noted that FIGURE 2 shows the time of the individual leaching process to be about one and a half hours. This period takes into account the amount of time required to raise the solvent to the leaching temperature and to balance the over-all operation. The one hour duration refers to the amount of time at which the solvent is at its raised temperature and the mixture of solvent and surplus powder is being agitated.

The following examples demonstrate the effectiveness of this process as compared with the older process of leaching an aqueous slurry in a single tank. In an average run of the old process, surplus cannon powder was ground in a hammer mill to a size sufficient to pass through a ⅛ inch screen. About 4,500 pounds of powder was mixed with water in the ratio of one part powder and 2.6 parts of water by weight and the resulting slurry placed in a five thousand gallon agitated vessel to which four parts of benzene were added. The leaching operation was then carried out for four hours at 65° C. The benzene and water were drained off by decantation and by draining through a false bottom screen in the vessel. Then, 2.6 parts of water and four parts of benzene were added and the powder leached for four more hours by agitating at 65° C. This process was repeated for a third time. After the final leaching process was completed, the residual benzene was distilled off from the mixture of powder and water. A laboratory analysis utilizing solvent leaching with either ether or methylene chloride showed that the nitrocellulose recovered in this case had a typical extractable content averaging about 1.5 percent.

In accordance with the process of the present invention, FHN cannon powder containing about ten percent dinitrotoluene, five percent dibutyl phthalate and one percent diphenylamine was ground in a hammer mill to a size sufficient to pass through a ⅛ inch screen. Eight thousand pounds of this powder was slurried with water and pumped into a five thousand gallon agitated vessel. The water was drained and an inert gas, specifically a propane combustion gas containing about 10% carbon dioxide, 1% carbon monoxide, less than 0.5% oxygen and the remainder nitrogen, was added to the vessel. A solvent composition containing ninety percent benzene and ten percent ethyl acetate was pumped into the vessel and the powder leached by agitating for one hour at 68° C. This solvent had been used for two prior leachings. The solvent was then decanted and drained off and a second solvent containing ninety percent benzene and ten percent ethyl acetate which had been used for one prior leaching process in a different vessel was pumped into this vessel and the powder again leached by agitating for one hour at 68° C. This solvent was then decanted and drained from the vessel and fresh solvent added for the third and final leaching process which took place again under agitation for one hour at 68° C. The powder was then allowed to settle in the leaching tank and the solvent was then drained off. The tank was opened, the powder slurried with water and pumped to another vessel where the residual benzene was distilled off. In this case, the extractable content as measured with laboratory solvent leaching with methylene chloride average about 0.35 percent extractables.

From the above examples, it can be seen that the nitrocellulose recovered according to the process of the present invention is of higher quality containing a significantly lesser amount of extractables. Moreover, under the present process, through the elimination of water in the system, it is possible to process a significantly greater amount of surplus powder in a leaching vessel of a given size as compared to the old leaching process which utilizes a slurry of water and surplus powder.

The elimination of water permits better contact of the surplus powder by the solvent thereby making the leaching operation faster and more effective. The presence of an atmosphere of an inert gas functions to prevent the conditions under which a fire could develop in the leaching vessel.

In addition, the countercurrent system utilizing two leaching vessels as heretofore explained permits reuse of the solvent resulting in a reduction of the amount of solvent necessary for the continuous use of the system. Further, with the particular countercurrent system of the present invention, the amount of equipment needed is kept to a minimum.

While reference has been made above to a preferred embodiment of the present invention, various modifications of the invention will readily suggest themselves to those skilled in the art and the scope of this invention should therefore be ascertained by reference to the following claims.

What is claimed is:

1. A process for recovering nitrocellulose from ground surplus powder containing nitrocellulose and nonnitrocellulose organic materials, comprising leaching said ground surplus powder with a solvent for said non-nitrocellulose organic materials in an inert atmosphere at a temperature which is above ambient temperature.

2. The process of claim 1, wherein said solvent is selected from the group consisting of benzene, toluene, and isopropyl alcohol.

3. The process of claim 1, wherein said inert atmosphere is a gas selected from the group consisting of nitrogen, carbon dioxide, and combustion products of hydrocarbons having a low oxygen content.

4. The process of claim 1, wherein said leaching temperature is above ambient temperature and below about 85° C.

5. A process for recovering nitrocellulose from ground surplus powder containing nitrocellulose and non-nitrocellulose organic materials, which comprises leaching said ground surplus powder with a solution having a major proportion of a solvent for the non nitrocellulose organic materials and having a minor proportion of a softening agent for nitrocellulose, said leaching being carried out in an inert atmosphere at a temperature which is above ambient temperature.

6. The process of claim 5, wherein said softening agent is selected from the group consisting of ethyl acetate, butyl acetate, acetone, and methyl ethyl ketone.

7. A process for recovering nitrocellulose from ground surplus powder containing nitrocellulose and non-nitrocellulose organic material which process comprises the steps of: forming a slurry of said powder with a solvent for said non-nitrocellulose organic material in an inert atmosphere at a temperature which is above ambient temperature; agitating said slurry to facilitate solvation of said non-nitrocellulose organic material in said solvent; and separating the resulting solvate from the remaining nitrocellulose.

8. The process of claim 7, wherein said solvent is selected from the group consisting of benzene, toluene, and isopropyl alcohol.

9. The process of claim 7, wherein said inert atmosphere is a gas selected from the group consisting of nitrogen, carbon dioxide, and combustion products of hydrocarbons having a low oxygen content.

10. The process of claim 7, wherein said temperature is above ambient temperature but below about 85° C.

11. A process for recovering nitrocellulose from ground surplus powder containing nitrocellulose and non-nitrocellulose organic material comprising agitating a mixture of said ground surplus powder with a solution of a solvent for said non-nitrocellulose organic material and a softening agent for said nitrocellulose in an inert atmosphere and at a temperature above ambient temperature and below about 85° C. to extract the non-nitrocellulose organic material, and separating said solvent containing said non-nitrocellulose organic material and said softening agent from the remaining nitrocellulose.

12. The process of claim 11, wherein said softening agent is selected from the group consisting of ethyl acetate, butyl acetate, acetone, and methyl ethyl ketone.

13. A process for recovering nitrocellulose from ground surplus powder containing nitrocellulose and non-nitrocellulose organic material comprising leaching the ground surplus powder in an inert atmosphere with a first solvent for the non-nitrocellulose organic material, removing said solvent and the extracted non-nitrocellulose organic material, leaching said ground surplus powder in an inert atmosphere with a second solvent for the non-nitrocellulose organic material, said second solvent initially containing a lower percentage of extracted non-nitrocellulose organic material than said first solvent, separating said second solvent and the extracted non-nitrocellulose organic material from said ground surplus powder, and leaching said surplus powder in an inert atmosphere with a third solvent for the non-nitrocellulose organic material, said third solvent initially containing substantially no extracted non-nitrocellulose organic material, said leaching steps being performed at a temperature which is above ambient temperature.

14. The process of claim 13, wherein said solvent is selected from the group consisting of ethyl acetate, butyl acetate, acetone, and methyl ethyl ketone.

15. The process of claim 13, wherein said inert atmosphere is a gas selected from the group consisting of nitrogen, carbon dioxide, and combustion products of hydrocarbons having low oxygen content.

16. The process of claim 13, wherein said leaching steps are performed at a temperature which is above ambient temperature and below about 85° C.

17. A continuous process for recovering nitrocellulose from ground surplus powder containing nitrocellulose and non-nitrocellulose organic materials, which process comprises the steps of: providing first and second leaching zones; introducing a first charge of said powder into said first leaching zone; introducing a first charge of a solvate for said non-nitrocellulose organic materials into said first leaching zone, said first solvate charge initially containing an amount of non-nitrocellulose organic materials in solution therein; leaching said first powder charge by agitating said first powder charge and said first solvate charge in an inert atmosphere and at a temperature which is above ambient temperature thereby increasing the amount of non-nitrocellulose organic materials in solution in said first solvate charge; discarding said first solvate charge from said first leaching zone; introducing a second charge of solvate for said non-nitrocellulose organic materials into said first leaching zone, said second solvate charge initially having an amount of non-nitrocellulose organic materials in solution therein which initial amount is less than the amount of non-nitrocellulose organic materials initially in solution in said first solvate charge, and simultaneously introducing a second charge of said powder into said second leaching zone; leaching said first powder charge by agitating said first powder charge and said second solvate charge in an inert atmosphere and at a temperature which is above ambient temperature thereby increasing the amount of non-nitrocellulose organic materials in solution in said second solvate charge; transferring said second solvate charge to said second leaching zone and subsequently introducing a charge of solvent for said non-nitrocellulose organic materials into said first leaching zone, said solvent charge being inititially free from dissolved non-nitrocellulose organic materials; simultaneously leaching said first powder charge and said second powder charge by agitating said first powder charge and said solvent charge, and by agitating said second powder charge and said second solvate charge in an inert atmosphere and at a temperature which is above ambient temperature; discarding said second solvate charge from said second leaching zone; transferring said solvent charge from said first leaching zone to said second leaching zone; removing the first treated powder charge from said first leaching zone and subsequently introducing a third charge of said powder into said first leaching zone; leaching said second powder charge by agitating said second powder charge and said solvent charge in an inert atmosphere and at a temperature which is above ambient temperature; transferring said solvent charge from said second leaching zone to said first leaching zone and subsequently introducing another solvent charge for said non-nitrocellulose organic materials into said second leaching zone, said other solvent charge being initially free from dissolved non-nitrocellulose organic materials; simultaneously leaching said second powder charge and said third powder charge by agitating said third powder charge and said solvent charge, and by agitating said second powder charge and said other solvent charge in an inert atmosphere and at a temperature which is above ambient temperature; discarding said solvent charge from said first leaching zone; transferring said other solvent charge to said first leaching zone; removing the second treated powder charge from said second leaching zone; and thereafter repeating each of said steps in cyclic progression.

References Cited

UNITED STATES PATENTS 3,325,571  6/1967  Sapiego _____ 264—3
2,970,996  2/1961  Silk _____ 260—223

DONALD E. CZAJA, *Primary Examiner.*

R. W. MULCAHY, *Assistant Examiner.*